US009996171B2

(12) United States Patent
Chase et al.

(10) Patent No.: US 9,996,171 B2
(45) Date of Patent: *Jun. 12, 2018

(54) METHOD FOR USING A TWO-DIMENSIONAL TOUCHPAD TO MANIPULATE A THREE-DIMENSIONAL IMAGE

(71) Applicant: Grayhill, Inc., La Grange, IL (US)

(72) Inventors: Torsten F. Chase, Medina, OH (US); Kevin M. Dooley, Chicago, IL (US); Robert F. Kerner, Chicago, IL (US)

(73) Assignee: Grayhill, Inc., La Grange, IL (US)

(*) Notice: Subject to any disclaimer, the term of this patent is extended or adjusted under 35 U.S.C. 154(b) by 0 days. days.

This patent is subject to a terminal disclaimer.

(21) Appl. No.: 15/649,876

(22) Filed: Jul. 14, 2017

(65) Prior Publication Data

US 2017/0315635 A1 Nov. 2, 2017

Related U.S. Application Data

(63) Continuation of application No. 14/540,655, filed on Nov. 13, 2014, now Pat. No. 9,733,734.

(51) Int. Cl.
*G06F 3/0354* (2013.01)
*G06F 3/0488* (2013.01)
*G06F 3/0481* (2013.01)
*G06F 3/0484* (2013.01)
*G06F 3/044* (2006.01)

(52) U.S. Cl.
CPC .......... *G06F 3/03547* (2013.01); *G06F 3/044* (2013.01); *G06F 3/04815* (2013.01); *G06F 3/04845* (2013.01); *G06F 3/04883* (2013.01); G06F 2203/04104 (2013.01); G06F 2203/04808 (2013.01)

(58) Field of Classification Search
CPC ............ G06F 3/03547; G06F 3/03545; G06F 3/0416; G06F 3/044; G06F 3/04845; G06F 3/04815; G06F 3/04883; G06F 2203/04101; G06F 2203/04104; G06F 2203/04808
See application file for complete search history.

(56) References Cited

U.S. PATENT DOCUMENTS

2006/0066588 A1* 3/2006 Lyon ..................... G06F 3/0488
345/173
2008/0309632 A1* 12/2008 Westerman ............. G06F 3/038
345/173

(Continued)

*Primary Examiner* — Dmitriy Bolotin
(74) *Attorney, Agent, or Firm* — K&L Gates LLP

(57) ABSTRACT

A method manipulates a 3D image in three dimensions using two-dimensional gestures on a touchpad. The method moves the 3D image within an x-y plane in the direction of a multiple-finger linear gesture. A number of fingers used for the multiple-finger linear gesture is programmed in an instinct library associated with the touchpad. The method detects a multiple-finger linear gesture on a mutual capacitance touchpad and rotates the 3D image in the direction of the multiple-finger linear gesture about an axis in the x-y plane perpendicular to the multiple-finger linear gesture. The method also rotates the 3D image about the x-y plane in the direction of the multiple-finger linear gesture at a speed proportional to the speed of the multiple-finger linear gesture.

20 Claims, 5 Drawing Sheets

(56) References Cited

U.S. PATENT DOCUMENTS

| | | | |
|---|---|---|---|
| 2010/0241973 A1* | 9/2010 | Whiddett | G06F 3/04883 715/762 |
| 2011/0164029 A1* | 7/2011 | King | G06F 3/04883 345/419 |
| 2013/0113729 A1* | 5/2013 | Chiang | G06F 3/04883 345/173 |
| 2013/0127825 A1* | 5/2013 | Joshi | G06T 19/20 345/419 |
| 2015/0089452 A1* | 3/2015 | Dorninger | G06Q 10/101 715/848 |

* cited by examiner

METHOD FOR USING A TWO-DIMENSIONAL TOUCHPAD TO MANIPULATE A THREE-DIMENSIONAL IMAGE

PRIORITY CLAIM

This application is a continuation of U.S. application Ser. No. 14/540,655 filed Nov. 13, 2014, the entire contents of which are incorporated herein by reference.

BACKGROUND OF THE INVENTION

The present invention generally relates to a method for manipulating a three-dimensional (hereinafter "3D") image on a two-dimensional (hereinafter "2D") touchpad. A need exists for manipulation of three-dimensional images in a variety of fields including medical imaging, artistic design, engineering design including computer aided drafting (CAD), kinesiology, sports simulation, geological research and archeology. The invention is not limited to any particular field of research or endeavor.

Interactive input systems allow users to provide input into an application program using an active pointer (e.g., a pointer that emits light, sound or other signal), a passive pointer (e.g., a finger, a cylinder, or other suitable object) or other suitable input device are known. Multi-touch interactive input systems that receive and process input from multiple pointers using machine vision are also known. More specifically, a subset of multi-touch systems use capacitive touch panels having an insulator, such as glass, and coated with a transparent conductor such as indium tin oxide (ITO) are also known. Further, it is known that the human body is an electrical conductor. Thus, a person may touch the surface of a multi-touch system screen to distort the screen's electrostatic field. The distortion may be measurable as a change in capacitance. Also, different technologies may be used to determine the location of the touch before sending the location to a controller for processing.

Projected Capacitive Touch (hereinafter "PCT") technology is a variant of capacitive touch technology. PCT touch screens may have a matrix of rows and columns of conductive material layered upon sheets of glass. PCT touch screen fabrication techniques may include etching a single conductive layer on sheets of glass to form a grid pattern of electrodes or by etching two separate perpendicular layers of conductive material with parallel lines or tracks to form a grid. Voltage applied to this grid creates a uniform electrostatic field that can be measured. A conductive object, such as a finger, for example, may contact a PCT panel to distort the local electrostatic field at that point to thus create a measurable change in capacitance. Further, if the finger bridges the gap between two of the etched "tracks" on the glass, the charge field may be further interrupted and thus detected by a controller. Accordingly, the capacitance may be altered and measured at every individual point on the grid allowing the system to accurately track touches. Further, PCT systems may sense a passive stylus or gloved fingers as well.

Two variants of PCT technology are generally known, namely, mutual capacitance and self-capacitance. Mutual capacitance relies on conductive objects that may hold a charge when the conductive objects are placed in close proximity. In mutual capacitive sensors, a capacitor is provided at every intersection of each row and each column. A 16-by-14 array, for example, has 224 independent capacitors. The local electrostatic field created by a grid of independent capacitors may be altered by applying a voltage to the grid and/or bringing a finger or conductive stylus close to the surface of the sensor to reduce mutual capacitance. The capacitance change at every individual point on the grid is measured to accurately determine the touch location by measuring the voltage in the other axis. Mutual capacitance allows a multi-touch operation where multiple fingers, palms or styli are tracked at the same time. In comparison, currently available methods do not use mutual capacitance technology.

Self-capacitance, i.e. the amount of electrical charge that is added to an isolated conductor to raise its electrical potential by one unit, may be used in PCT technology. Self-capacitance sensors may be designed to employ the same X-Y grid as mutual capacitance sensors; however, the columns and rows in such an arrangement may operate independently. With self-capacitance, the capacitive load of a finger is measured on each column or row electrode by a current meter. This method produces a stronger signal than mutual capacitance. However, the method is unable to accurately resolve more than one finger and thus results in "ghosting", or misplaced location sensing.

Advances in the ability to manipulate 3D objects on a screen may prove especially beneficial in medical imaging applications. The field of medical imaging includes a variety of imaging modalities including, but not limited to, magnetic resonance imaging ("MRI"), x-ray ("XR"), computed tomography ("CT"), ultrasound and positron emission tomography ("PET"). These imaging modalities may generate three-dimensional images of anatomic structures. Physicians, medical students and other healthcare professionals often manipulate these structures for analysis from various angles. In the case of 3D ultrasound, many practitioners use joysticks connected to a terminal. Further, the use of a joystick may require that the physician use a dedicated terminal. Thus, practitioners often manipulate images from a remote location either during a procedure as part of a collaborative effort and/or as part of a post-procedure analysis.

Similarly, a need exists for engineers and other professionals to examine mechanical structures from multiple angles and at various physical locations. A need also exists for artists, architects, interior decorators, graphic designers and/or other designers to view and manipulate 3D images of various products and designs.

SUMMARY OF THE INVENTION

The present invention generally relates to a method for manipulating a 3D image using 2D gestures on a touchpad. The method detects a multiple-finger linear gesture on a touchpad, generates a signal indicative of the multiple-finger linear gesture and moves the 3D image within the x-y plane in the direction of the multiple-finger linear gesture. In an embodiment of the invention, the number of fingers used for the multiple-finger linear gesture on the touchpad may be, for example, two fingers.

More particularly, in an embodiment of the invention, a method for manipulating a 3D image is provided. The method detects a two-finger linear gesture on a touchpad. The touchpad may generate a signal indicative of the two-finger linear gesture and may display a corresponding movement of the 3D image on a screen.

In another embodiment of the invention, a method for manipulates a 3D image. The method detects a multiple-finger linear gesture on a touchpad. The method may rotate the 3D image in the direction of the multiple-finger linear gesture about an axis in the x-y plane perpendicular to the multiple-finger linear gesture.

In yet another embodiment of the invention, a method for manipulating a 3D image is provided. The method detects a multiple-finger linear gesture on a touchpad. The touchpad may generate a signal indicative of the multiple-finger linear gesture. The touchpad may determine the speed of the multiple-finger linear gesture. Further, a touchscreen may display the 3D image and may rotate the 3D image in the direction of the multiple-finger linear gesture about an axis in the x-y plane perpendicular to the multiple-finger linear gesture. The rotation of the 3D image may be at a speed proportional to the speed of the multiple-finger linear gesture.

It is, therefore, an advantage of the present invention is to provide for multiple-finger, such as two-finger, for example, linear gesture detection using mutual capacitance.

Another advantage of the present invention is to provide for the navigation of the 3D image in the direction of a one-finger gesture on the touchpad and to transmit a signal indicating selection of the 3D image for manipulation.

Another advantage of the present invention is to provide for the rotation of the 3D image within the x-y plane in the direction of a two-finger rotational gesture on the touchpad.

Another advantage of the present invention is to provide rotation of the 3D image within the x-y plane in the direction of a three-finger rotational gesture on the touchpad.

Another advantage of the present invention is to provide for a method that detects a two-finger gesture having a rotational component and a translational component, rotates the 3D image in the direction of the rotational component and affects the x-y position of the 3D image in the direction of the translational component.

Another advantage of the present invention is to change the x-y position of the 3D image in response to a two-finger linear gesture. Another advantage of the present invention is to provide for the rotation of the 3D image in the direction of a two-finger rotational gesture within the x-y plane wherein the 3D image continues to rotate after the two-finger rotational gesture.

Another advantage of the present invention is to provide for the transmission a stop signal to halt the changing of the x-y position of the 3D image.

Another advantage of the present invention is to determine the speed of the two-finger linear gesture on the touchpad and to move the 3D image in the direction of the two-finger linear gesture at a speed proportional to the speed of the two-finger linear gesture.

Another advantage of the present invention is to determine the speed of the two-finger linear gesture on the touchpad and to move the 3D image after the two-finger linear gesture for a time period proportional to the speed of the two-finger linear gesture. Another advantage of the present invention is to determine the speed of a two-finger rotational gesture on the touchpad and move the 3D image after the two-finger rotational gesture for a time period proportional to the speed of the two-finger rotational gesture.

Another advantage of the present invention is to detect a multiple-finger linear gesture on a mutual capacitance touchpad wherein the multiple-finger linear gesture requires at least three fingers and rotates the 3D image in the direction of the multiple-finger linear gesture about an axis in the x-y plane perpendicular to the multiple-finger linear gesture.

Another advantage of the present invention is to provide for the navigation of the 3D image in the direction of a one-finger gesture on the touchpad and transmitting a signal indicating the selection of the 3D image for manipulation.

Another advantage of the present invention is to provide for the rotation of the 3D image in response to the multiple-finger linear gesture.

Another advantage of the present invention is to detect a multiple-finger linear gesture on a touchpad, generate a signal indicative of the multiple-finger linear gesture, determine the speed of the multiple-finger linear gesture, and rotate the 3D image in the direction of the multiple-finger gesture about an axis in the x-y plane perpendicular to the multiple-finger linear gesture at a speed proportional to the speed of the multiple-finger linear gesture.

Another advantage of the present invention is to provide for the rotation of the 3D image after the multiple-finger linear gesture for a time period proportional to the speed of the multiple-finger linear gesture.

Another advantage of the present invention is to provide for the transmission of a stop signal to halt rotation of the 3D image about the x-y plane.

Another advantage of the present invention is to detect the multiple-finger linear gesture using mutual capacitance.

Additional features and advantages of the present invention are described in, and will be apparent from, the detailed description of the presently preferred embodiments and from the drawings.

DETAILED DESCRIPTION OF THE PREFERRED EMBODIMENTS

The present invention may allow an artist, architect, interior decorator, designer, engineer, physician and/or other professional to use a portable electronic device that enables manipulation of a 3D image on a touchpad. The individual may examine the 3D image at any time and/or at any location, such as, for example, at home or in an automobile.

The present invention provides a method for manipulating a 3-D image in the x, y and z directions through coordinated user finger gestures on a touchpad. The method detects one or more touches on the touchpad and/or one or more movements on the touchpad. A touch is a stationary placement of a human finger and/or other object upon the touchpad. As used in this application including the claims, the term finger may refer to a human finger or any other object that may be used to contact a touchpad or touchscreen, such as a stylus. A movement is any dragging, rotational or other motion of a finger or other object while in contact with the touchpad. The method may, for example, detect two simultaneous touches, three simultaneous touches, four simultaneous touches or five simultaneous touches. Likewise, the method may detect two simultaneous movements, three simultaneous movements, four simultaneous movements or five simultaneous movements.

In an embodiment of the invention, the touchpad may be programmed with an 'instinct library,' defined as a predetermined set of instructions regarding output panning and rotating information associated with a gesture generated by the contact of one or more fingers to the touchpad. A user, programmer and/or other person and/or entity may decide upon the number of fingers to be used and/or associated with each gesture. For example, the 'instinct library' of the touchpad may be programmed to require the simultaneous touching of three fingers to the touchpad to accordingly pan an image displayed on a monitor, TV, and/or similar screen. Likewise, a user and/or programmer may program and/or configure the 'instinct library' to require the simultaneous touching of two fingers to the touchpad to, for example, rotate an object, and/or the simultaneous touching of four fingers to the touchpad to rotate an object. As discussed above, the user and/or programmer may qualify and/or enter the relative pan and/or rotational information into the 'instinct library' to set a number of fingers required to generate and/or facilitate a particular gesture.

Figure 1A:
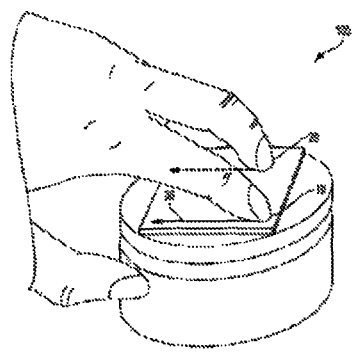
FIG. 1A illustrates a perspective view of a two-finger linear gesture in the x direction on a touchpad.

Referring generally to FIG. 1A, the method set forth by the present invention may detect an amount of time of one or more touches and/or one or more movements on the touchpad 100. The method may use an internal clock/timer that may be triggered by the detection of a touch/movement and turned off by the cessation of the touch/movement. Further, the duration of a touch may influence the effect a subsequent gesture on the 3D image 160. Similarly, the duration of a gesture may affect the change in position/orientation of the 3D image 160 produced in response to the gesture. Also, the method detects a speed of one or more movements on the touchpad 100. The speed may be calculated based on the duration of a movement and the total distance traversed by the movement on the touchpad. Alternatively, the speed may be approximated based on the time of a movement and the number of zones covered by a movement. The method may detect and/or calculate an acceleration corresponding to one or more movements on the touchpad 100. The acceleration may be calculated based on periodic measurements of speed over the course of a gesture.

The method uses a two-dimensional touchpad to manipulate a three-dimensional image. The method may be compatible with any device having a touchpad. Accordingly, the method may use an electronic tablet with a display screen that may be configured to be a touchpad. Also, the method may use an electronic tablet having a touchpad separate from the display screen. Further, the method may use a laptop computer having a touchpad. Alternatively, the method may use a stand-alone accessory having a touchpad. Also, the method may use a device which may have an additional object, such as a knob, capable of being manipulated by a user. The touchpad may be positioned atop or within a knob or other object. Still further, the method may apply a touchpad gesture to a touchpad wherein a microprocessor connected to the touchpad generates a signal indicative of the touchpad gestures in response to application of the touchpad gestures to the touchpad. Commonly assigned U.S. patent application Ser. No. 13/406,617 is hereby incorporated in its entirety by reference into the present application.

In an embodiment, a finger or other object may contact the touchpad for a specified length of time, such as, for example, at least 0.1 seconds, to register a contact established with the touchpad 100. Alternatively, the finger or other object may be within a specified distance, such as, for example a maximum 2.5 mm, from the touchpad to register a contact established with the touchpad 100. The method may require that a given gesture moves along the touchpad at a specified speed, such as, for example at least 1.5 mm/sec to produce the desired movement and/or rotation. Also, the 3D image 160 may be selected before the 3D image 160 may be manipulated by way of a touch and/or a gesture event on the touchpad. The touch and/or the gesture event may be separate from the touch/gesture used to manipulate the 3D image.

A touchpad PC board and/or other microprocessor may be electrically connected to the touchpad 100. The touchpad gestures may be applied to the touchpad 100 that may be provided as part of, for example, a knob. A movement of the knob in combination with the touchpad gesture may produce an effect on the position/orientation of the 3D image 160. For example, a gesture on the touchpad 100 may initiate the translation and/or re-orientation of the 3D image 160, and use of the knob may fine-tune the movement and/or re-orientation of the 3D image 160. Further, the touchpad gesture and the knob movement may be configured to be substitutable so that the gesture and the knob movement may produce the same effect on the 3D image 160. Also, the knob movement may be used to select the 3D image 160 for subsequent manipulation.

Further, the method may have the step of preventing rotation of a touchpad PC board when the knob rotates. For example, connection of the touchpad PC board to a shaft clip connected to the actuator shaft may prevent rotation of the touchpad PC board when the knob rotates. The touchpad 100 and/or the touchpad PC board may be electrically connected to a display screen which displays the 3D image. Alternatively, neither the touchpad 100 nor the touchpad PC board may be electronically connected to the display screen. For example, the touchpad PC board or other microprocessor associated with the touchpad 100 may communicate with a microprocessor associated with the display screen through a wired or wireless data connection.

Figure 1B:
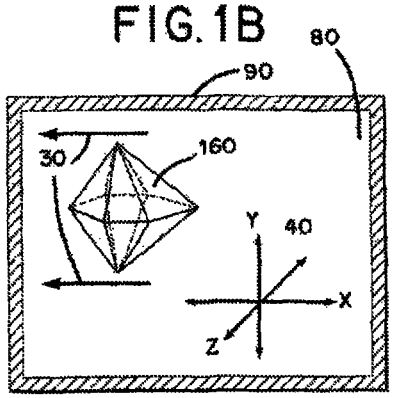
FIG. 1B illustrates a graphical view of the translation of the 3D image in the x direction within the x-y plane on a screen corresponding to the two-finger linear gesture on a touchpad.
Figure 1C:
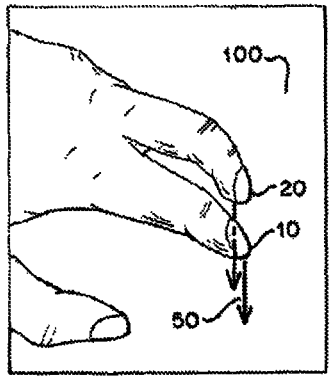
FIG. 1C illustrates a perspective view of a two-finger linear gesture in the y direction on a touchpad.
Figure 1D:
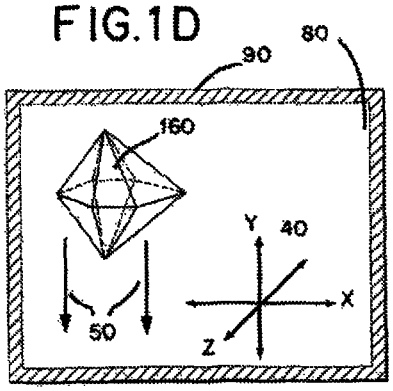
FIG. 1D illustrates a graphical view of the translation of the 3D image in the y direction within the x-y plane on a screen corresponding to the two-finger linear gesture on a touchpad.

FIG. 1A and FIG. 1B illustrate that a two-finger linear motion in the X-direction 30 that may be detected by mutual capacitance and may result in a corresponding panning motion of the 3D image 160 along the X-axis in the X-direction 30 on a display screen 80 surrounded by a border 90. Similarly, FIGS. 1C and 1D illustrate a two-finger linear motion in the Y-direction 50 that may pan the 3D image 160 along the Y-axis in the Y-direction 50 on the display screen 80. As seen here, a two-finger linear panning motion may confer several advantages over a one-finger linear motion. For example, using two fingers instead of one finger to pan an object may reduce movement of the object resulting from, for example, inadvertent stray finger movement. The avoidance of inadvertent object movement may be desirable in a medical setting where such movement may disrupt medical discussions, analysis and/or medical procedures. Moreover, the use of two fingers allows for simultaneous rotation and/or panning of an object. In example, by assigning the use of two fingers to translate the 3D image 160, a one-finger gesture may be used to perform another movement such as navigation toward and/or away from the 3D image 160.

Figure 1E:
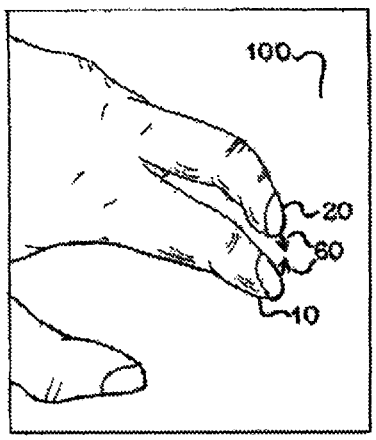
FIG. 1E illustrates a perspective view of a two-finger pinch-in motion on a touchpad.
Figure 1F:
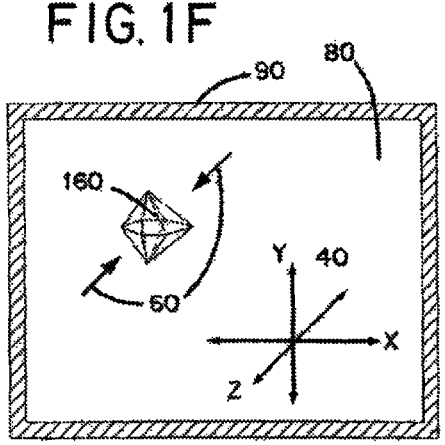
FIG. 1F illustrates a graphical view of the shrinking of the 3D image in the z direction corresponding to the two-finger pinch-in motion on a touchpad.
Figure 1G:
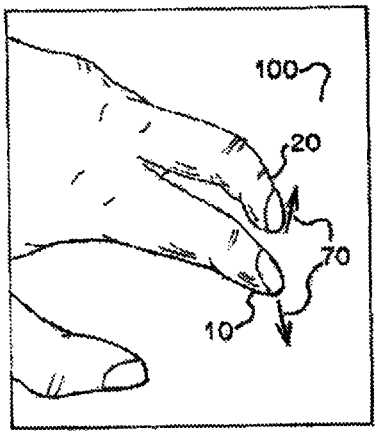
FIG. 1G illustrates a perspective view of a two-finger pinch-out motion on a touchpad.
Figure 1H:
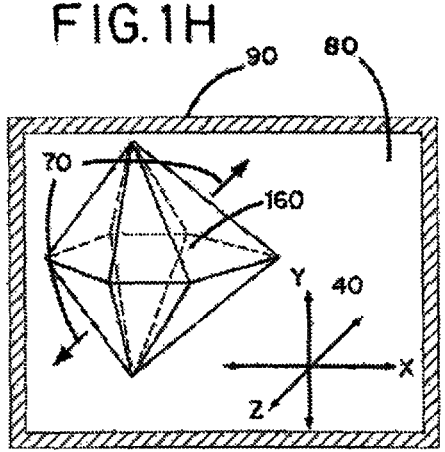
FIG. 1H illustrates a graphical view of the enlarging of the 3D image in the z direction corresponding to the two-finger pinch-out motion on a touchpad.

Referring to FIGS. 1E and 1F, a two-finger pinch-in motion 60 is illustrated that may be detected by mutual capacitance where a first finger 10 may approach a second finger 20 on the touchpad 100. The pinch-in motion 60 may shrink the 3D image 160 along the Z-axis. Likewise, a two-finger pinch-out motion in the Z direction as shown in FIGS. 1G and 1H may enlarge the 3D image 160 along the Z-axis. Changes in graphical properties such as detail, contrast or shadowing may be produced with respect to the 3D image 160 to reflect zooming out or zooming in from the 3D image 160.

Figure 1I:
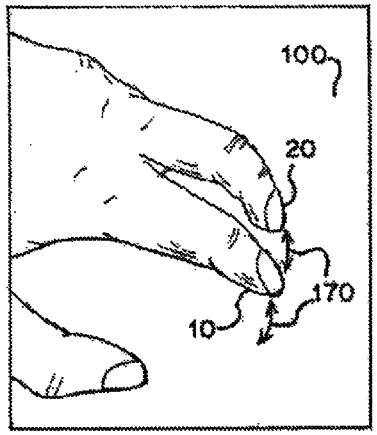
FIG. 1I illustrates a perspective view of a two-finger rotating motion on a touchpad.
Figure 1J:
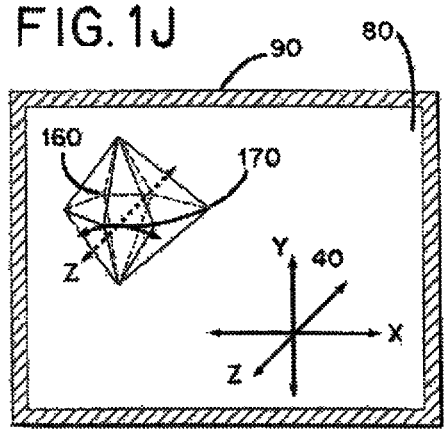
FIG. 1J illustrates a graphical view of the rotation of the 3D image in either direction on the z axis on a screen corresponding to the two-finger rotating motion on a touchpad.

Referring generally to FIG. 1I and FIG. 1J, a two-finger rotating motion 170 in the x-y plane on the touchpad 100 may be detected by mutual capacitance and may rotate the 3D image 160 in the direction of movement and about the Z-axis. The rotation produced by a two-finger rotating motion 170 in the x-y plane is about the Z-axis that passes through the center of the 3D image 160. Alternatively, the rotation produced by the two-finger rotating motion in the x-y plane may be about a user selected axis on the x-z plane that may pass through a point between the points of contact of the first finger 10 and the second finger 20 on the touchpad 100. The user selected axis may correspond to an analogous axis on the display screen 80. The rotation motion 170 on the touchpad 100 may rotate the 3D image 160 along the analogous axis on the screen 80. The point may be determined at the time of first contact of the two fingers on the touchpad or may be determined at the time of initiation of the rotating motion 170.

In an embodiment, the user selected axis about which the 3D image 160 may rotate through a separate touch performed prior to the rotational gesture. Further, the two-finger rotating motion 170 performed while the two fingers are together generally moving in a linear direction on the touchpad 100 corresponding to the x-y plane on the screen 80 may result in the simultaneous rotation and panning of the image 160. The embodiment may accommodate both a translational component and a rotational component.

Figure 2A:
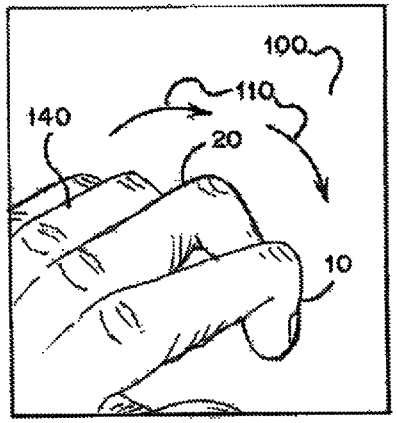
FIG. 2A illustrates a perspective view of a three-finger rotational gesture on a touchpad.
Figure 2B:
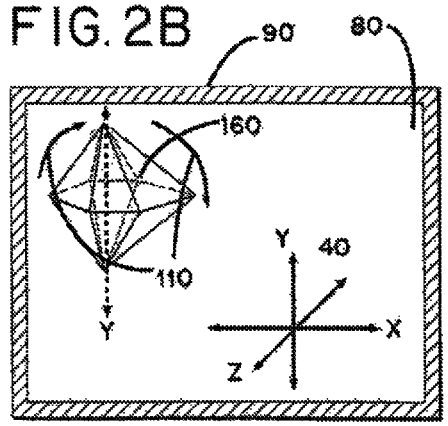
FIG. 2B illustrates a graphical view of the rotation of a 3D image within the x-y plane on a screen corresponding to the three-finger rotational gesture on a touchpad.

Referring generally to FIG. 2A and FIG. 2B, the first finger 10, the second finger 20 and the third finger 140 may be detected by mutual capacitance and may form a three-finger rotational gesture 110 in the x-y plane on the touchpad 100 that may rotate the 3D image 160 in the direction of a three-finger rotational gesture on the screen 80. The three-finger rotational gesture 110 in the x-y plane may be either in the clockwise direction or the counter-clockwise direction to produce an analogous rotation of the 3D image 160 in the direction of a three-finger rotational gesture on the screen 80.

Figure 3A:
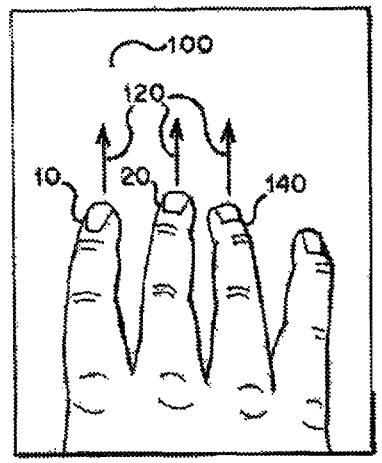
FIG. 3A illustrates a perspective view of a three-finger linear gesture in the y direction on a touchpad.
Figure 3B:
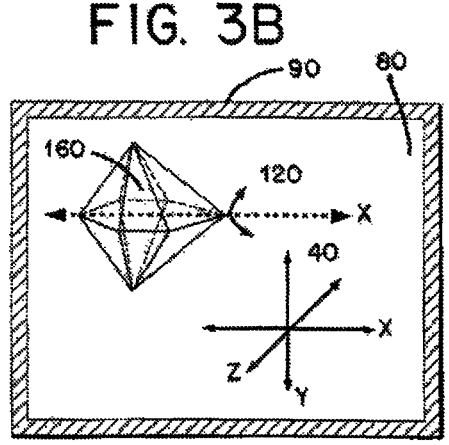
FIG. 3B illustrates a graphical view of the rotation of the 3D image about the x axis in the x-y plane perpendicular to the three-finger linear gesture in the y direction on a touchpad wherein the rotation of the 3D image is displayed on a screen.

Referring generally to FIG. 3A and FIG. 3B, a multiple-finger linear motion 120 involving three or more fingers may be detected by mutual capacitance and may rotate the 3D image 160 in the direction of the linear motion and about an axis in the x-y plane. For instance, a multiple-finger linear motion 120 in the Y-direction may rotate the 3D image 160 about the X-axis. More specifically, a three-finger linear motion in the Y-direction may rotate the 3D image 160 about the X-axis. Similarly, a four-finger linear motion in the Y-direction may rotate the 3D image 160 about the X-axis. Also, a five-finger linear motion in the Y-direction may rotate the 3D image 160 about the X-axis.

Figure 4A:
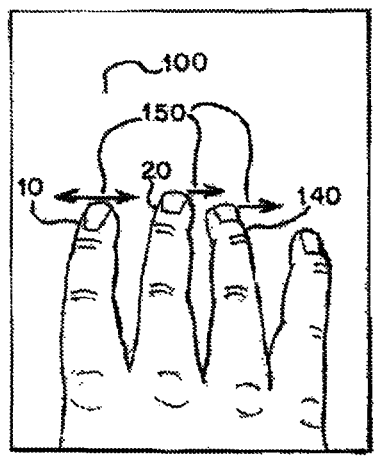
FIG. 4A illustrates a perspective view of a three-finger linear gesture in the x direction on a touchpad.
Figure 4B:
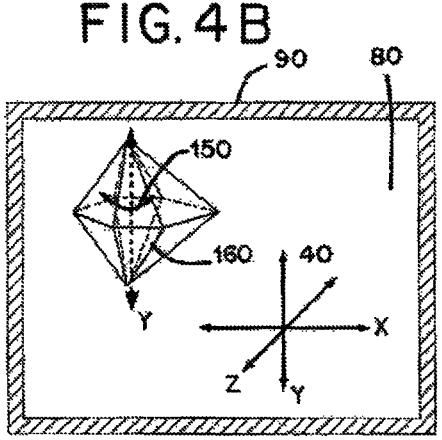
FIG. 4B illustrates a graphical view of the rotation of the 3D image about the y axis in the x-y plane perpendicular to the three-finger linear gesture in the x direction on a touchpad wherein the rotation of the 3D image is displayed on a screen.

Referring generally to FIG. 4A and FIG. 4B, a multiple-finger linear motion 150 involving three or more fingers in the X-direction may be detected by mutual capacitance and may rotate the 3D image 160 about the Y-axis. A three-finger linear motion in the X-direction may rotate the 3D image 160 about the Y-axis. A four-finger linear motion in the Y-direction may rotate the 3D image 160 about the X-axis. A five-finger linear motion in the Y-direction may rotate the 3D image 160 about the X-axis.

Referring generally to FIG. 3A, FIG. 3B, FIG. 4A and FIG. 4B, a multiple-finger linear motion involving three or more fingers in any direction within the x-y plane may be detected by mutual capacitance and may rotate the 3D image 160 about an axis within the x-y plane perpendicular to the multiple-finger linear motion. A multiple-finger touch or motion requires at least three or more fingers. A two-finger touch or motion does not constitute a multiple-finger touch or motion. Further, a particular multiple-finger touch or movement may require a minimum four fingers or a minimum five fingers. A three-finger linear motion in any direction within the x-y plane may rotate the 3D image 160 about an axis within the x-y plane perpendicular to the three-finger linear motion. A four-finger linear motion may rotate the 3D image 160 about the axis within the x-y plane perpendicular to the linear motion. A five-finger linear motion in the Y direction may rotate the axis within the x-y plane perpendicular to the linear motion.

The three fingers may contact the touchpad 100 at approximately the same time to enable rotation about an axis in the x-y plane. The three fingers may contact the touchpad 100 within a specified amount of time, such as, for example 25 milliseconds of the first finger to contact the touchpad 100. Two fingers may be located in contact with the touchpad 100 at the same time, and the third finger may contact the touchpad to enable rotation about an axis in the x-y plane. The second finger and the third finger may contact the touchpad after the first finger contacted the touchpad 100 to enable rotation about an axis in the x-y plane.

Figure 5A:
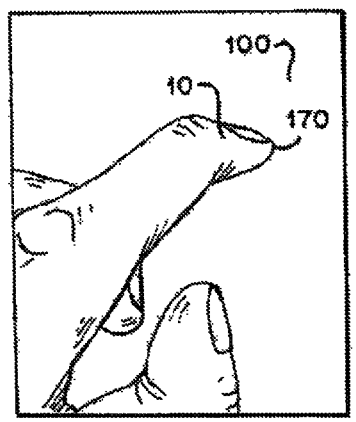
FIG. 5A illustrates a perspective view of a one-finger pointing motion on a touchpad.
Figure 5B:
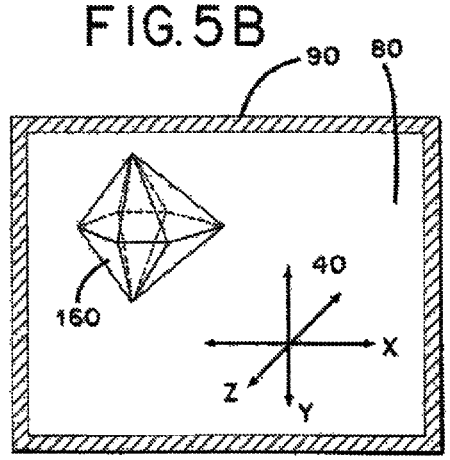
FIG. 5B illustration a graphical view of an identification of 3D object on a screen corresponding to the one-finger pointing motion on the touchpad.

Referring generally to FIG. 5A and FIG. 5B, the first finger 10 may be detected by mutual capacitance and may be used to make a single-finger gesture 170 to navigate to and/or select the 3D image 160 on the screen 80. The user may use the single-finger gesture 170 to navigate toward the 3D image 160 and then may place a second finger on the touchpad while maintaining contact with the first finger to select the 3D image 160 for subsequent manipulation. The 3D image 160 may be manipulated without lifting the fingers. The 3D image 160 may optionally be manipulated even if fingers are lifted after selection of the 3D image 160. The 3D image 160 may be manipulated after being selected if the fingers required for manipulation re-establish contact with the touchpad within a per-determined amount of time.

Referring generally to all figures, the 3D image 160 may rotate and/or pan after the fingers are lifted from the touchpad 100. The movement of the image may gradually slow after the fingers are lifted from the touchpad 100 and eventually may stop. The time required for the 3D image 160 to stop may depend on the speed of the gesture setting the 3D image in motion. The time required for the 3D image 160 to stop may depend on the time of contact between the fingers and the 3D image 160 before the gesture setting the image in motion. The image may continue to rotate until a stop signal is received. The stop signal may be an additional touch by a finger or fingers on the touchpad. The stop signal may be a single-finger touch on the 3D image 160. This stop signal may also be a two-finger touch on the 3D image 160.

The method of the present invention provides a gesture on the touchpad 100 to affect the orientation of the 3D image 160 in response to the gesture. Further, the 3D image 160 may be, in an embodiment, an anatomical structure representative of actual human anatomy. Accordingly, the method for diagnosing a human may allow a physician to examine an anatomical structure in three dimensions while in the process of performing, for example, a medical procedure or a surgical procedure. An embodiment of the current invention may also set forth a method for computer aided drafting that generates the 3D image 160 in response to an input and subsequent detection of a gesture on a touchpad that may thus affect the position and/or orientation of the 3D image 160. As a result, a design engineer may examine a structure in three dimensions during the process of designing the structure. Of course, many other applications of the present invention exist.

Various changes and modifications to the presently preferred embodiments described herein will be apparent to those skilled in the art. Such changes and modifications may be made without departing from the spirit and scope of the present invention and without diminishing its attendant advantages. Therefore, such changes and modifications are intended to be covered by the appended claims.

The invention claimed is:

1. A multi-touch input system comprising:
 a touch surface; and
 a processor, the processor configured to
  display a 3D image;
  detect a multiple-finger linear gesture on the touch surface; generate a signal indicative of the multiple-finger linear gesture;
  determine a speed of the multiple-finger linear gesture on the touch surface;
  rotate the 3D image for a time period proportional to the speed of the multiple-finger linear gesture; wherein said rotating comprises rotating the 3D image around a first axis when the multiple-finger linear gesture includes a first number of fingers, and rotating the 3D image around a second axis when the multiple-finger linear gesture includes a second number of fingers different from the first number of fingers, the second axis orthogonal to the first axis.

2. The system of claim 1, further comprising a memory, wherein the first and second number of fingers is programmed in a library stored in the memory.

3. The system of claim 1 wherein the touch surface is a mutual capacitance touch pad.

4. The system of claim 1, wherein the process is further configured to:
 detect a two-finger gesture having a rotational component and a translational component;
 rotate the 3D image in a direction of the rotational component; and
 pan an x-y position of the 3D image in a direction of the translational component.

5. The system of claim 1, wherein the processor is configured to alter an x-y position of the 3D image pursuant to the multiple-finger linear gesture.

6. The system of claim 1, wherein the processor is further configured to generate a stop signal to stop said rotation the 3D image about the first and second axes.

7. The system of claim 1, wherein the first number of fingers is four and the second number of fingers is five.

8. The system of claim 1, wherein the touch surface is a touch screen, the touch screen configured to display the 3D image.

9. The system of claim 1, wherein the processor is configured to rotate the 3D image after the multiple-finger linear gesture has stopped.

10. A system comprising:
 a touch surface; and
 a processor, the processor configured to
  display a 3D image at a location;
  detect a multiple-finger linear gesture on the touch surface,
  determine how many figures were used to make the multiple-finger linear gesture, if the multiple-finger linear gesture is a first multiple-finger linear gesture, change a view of the 3D image in a first manner; and
  if the multiple-finger linear gesture is not a first multiple-finger linear gesture, change the view the 3D image in a second manner.

11. The system of claim 10, wherein the processor is further configured to navigate toward the 3D image in the direction of the one-finger gesture on the touch surface in response to a one finger gesture; and generate a signal indicating the selection of the 3D image for manipulation.

12. The system of claim 10, wherein the first multiple-finger gesture is a three finger gesture.

13. The system of claim 12, wherein the 3D image is rotated in response to the three finger gesture.

14. The system of claim 10, wherein the processor is configured to change the view of the 3D image after the multiple-finger linear gesture has stopped.

15. The system of claim 10, wherein the processor is further configured to generate a stop signal to stop the change of view of the 3D image.

16. The system of claim 10, wherein the touch surface is a touch screen, the touch screen configured to display the 3D image.

17. A system comprising:
 a knob;
 a touch surface; and
 a processor, the processor configured to
  detect a gesture on a touch surface;

generate a signal indicative of the gesture;
determine the speed of the gesture on the touch surface;
move a 3D image a first distance within an x-y plane in a direction of the gesture;
detect a rotation of a knob; and
move the 3D image a second distance within the x-y plane in the direction of the gesture in response to the rotation of the knob, wherein the second distance is less than the first distance.

18. The system of claim 17, wherein the touch surface is positioned atop the knob.

19. The system of claim 17, wherein the first distance is based on the speed of the gesture.

20. The system of claim 17, wherein the gesture is a multiple-finger linear gesture.

* * * * *